US009792282B1

(12) United States Patent
Atkin et al.

(10) Patent No.: US 9,792,282 B1
(45) Date of Patent: Oct. 17, 2017

(54) AUTOMATIC IDENTIFICATION OF MACHINE TRANSLATION REVIEW CANDIDATES

(71) Applicant: International Business Machines Corporation, Armonk, NY (US)

(72) Inventors: Steven E. Atkin, Tampa, FL (US); Lisa McCabe, Lunenburg (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/206,374

(22) Filed: Jul. 11, 2016

(51) Int. Cl.
G06F 17/28 (2006.01)
G06F 9/44 (2006.01)

(52) U.S. Cl.
CPC ........ *G06F 17/2854* (2013.01); *G06F 9/4448* (2013.01); *G06F 17/2809* (2013.01); *G06F 17/289* (2013.01)

(58) Field of Classification Search
CPC ............... G06F 17/2854; G06F 17/289; G06F 17/2809; G06F 9/4448
See application file for complete search history.

(56) References Cited

U.S. PATENT DOCUMENTS

| | | | |
|---|---|---|---|
| 5,583,761 A * | 12/1996 | Chou | .................... G06F 9/4448 704/2 |
| 6,006,221 A | 12/1999 | Liddy et al. | |
| 6,321,191 B1 | 11/2001 | Kurahashi | |
| 7,447,624 B2 * | 11/2008 | Fuhrmann | ............. G06F 9/4448 704/2 |
| 8,131,536 B2 | 3/2012 | Weischedel et al. | |
| 2003/0101044 A1 * | 5/2003 | Krasnov | ............. G06F 17/2827 704/4 |
| 2006/0074634 A1 | 4/2006 | Gao et al. | |
| 2007/0050182 A1 * | 3/2007 | Sneddon | ............. G06F 17/2854 704/2 |
| 2008/0162112 A1 * | 7/2008 | Andersen | ............... G06Q 10/06 704/2 |

(Continued)

OTHER PUBLICATIONS

Dagienė, Valentina, and Gintautas Grigas. "Quantitative evaluation of the process of open source software localization." Informatica 17.1 (2006): 3-12.*

(Continued)

*Primary Examiner* — Brian Albertalli
(74) *Attorney, Agent, or Firm* — Garg Law Firm, PLLC; Rakesh Garg; Nicholas D. Bowman

(57) ABSTRACT

A portion of a software product is analyzed to determine a language and a subject-matter domain of the portion. A string is extracted from the portion, where the string has been translated into the language from an original string in an original language in a version of the software product. A corpus including a set of stored strings in the first language is selected. A subset of stored strings is selected from a content that is related to the subject-matter domain of the software product. When the string matches a stored string in the corpus, the string is selected into a shortlist and when a second string extracted from the portion fails to match any stored string in the corpus, the second string is excluded from the shortlist. The shortlist is output, causing a review of an accuracy of a machine translation process to be performed.

20 Claims, 4 Drawing Sheets

(56) References Cited

U.S. PATENT DOCUMENTS

| | | | | |
|---|---|---|---|---|
| 2009/0063126 A1* | 3/2009 | Itagaki | G06F 17/2818 | 704/2 |
| 2011/0074574 A1* | 3/2011 | Becker | G06F 9/4448 | 340/540 |
| 2011/0144972 A1* | 6/2011 | Koenig | G06F 9/4448 | 704/2 |
| 2012/0166174 A1* | 6/2012 | Lipetskaia | G06F 17/289 | 704/3 |
| 2012/0303352 A1* | 11/2012 | Coen | G06F 17/2854 | 704/2 |
| 2013/0103381 A1* | 4/2013 | Assche | G06F 17/2836 | 704/2 |
| 2014/0006004 A1* | 1/2014 | Gundepuneni | G06F 17/2264 | 704/2 |
| 2014/0156567 A1 | 6/2014 | Scholtes | | |
| 2015/0039286 A1* | 2/2015 | Nikoulina | G06F 17/2836 | 704/2 |
| 2016/0048506 A1* | 2/2016 | Levi | G06F 17/289 | 704/3 |
| 2016/0092440 A1* | 3/2016 | Bhuvaneswaran | G06F 17/2854 | 704/3 |
| 2016/0110346 A1* | 4/2016 | Lieske | G06F 9/4448 | 704/8 |
| 2016/0321160 A1* | 11/2016 | Joo | G06F 11/3608 | |

OTHER PUBLICATIONS

Yao, Yazhi. "An Ontology-Based Translation Memory Model in Localization Translation." Information Science and Engineering (ISISE), 2010 International Symposium on. IEEE, 2010.*

Goller et al. "Automatic Document Classification-A thorough Evaluation of various Methods." ISI 2000 (2000): 145-162.

Ni, Beyond multi-class—structured learning for machine translation. Diss. University of Southampton, 2010.

Dugast et al., "Statistical post-editing on SYSTRANS's rule-based translation system." Proceedings of the Second Workshop on Statistical Machine Translation. Association for Computational Linguistics, 2007.

Hutchins, " Machine translation today and tomorrow." [From: Gerd Willée, Bernhard Schröder, Hans-Christian Schmitz (eds.) Computerlinguistik: was geht, was kommt? Computational linguistics: achievements and perspectives. Festschrift für Winfried Lenders (Sankt Augustin: Gardez! Verlag, 2002), p. 159-162], 2002.

Giunchiglia; S-Match:an Algorithm and an Implementation of Semantic Matching, Jul. 2004, Hannover, Germany.

Yatskevich et al; Element level semantic matching using WordNet, Italy.

* cited by examiner

AUTOMATIC IDENTIFICATION OF MACHINE TRANSLATION REVIEW CANDIDATES

TECHNICAL FIELD

The present invention relates generally to a method, system, and computer program product for reviewing machine translated content for correctness. More particularly, the present invention relates to a method, system, and computer program product for automatic identification of machine translation review candidates.

BACKGROUND

Content presented in any form can be translated from one language to another. For example, text in one language can be translated into text in a different language using presently existing translation tools. Translation of content from one language to another, performed by a presently existing translation tool is referred to herein as "machine translation."

Software includes many elements. For example, the user interface (UI), the documentation, and example use cases are all different types of elements of a software product. Furthermore, the buttons, labels, menus, and other types of static content, which are coded in the software's code and can possibly be shown on the UI of the software under some circumstances are also elements of the software.

Many software products are developed in one language—the first or primary language—and then translated into one or more other languages. Much of the translation of software products occurs in the form of machine translation.

Machine translation is not always accurate, and often fails to produce a correct, intended, or desirable translation. Users are familiar with the difficulties associated with using a translated software product where the translation is incorrect, incomplete, inaccurate, incomprehensible, or otherwise confusing or unusable as a result of a machine translation that was not corrected before the translated product was made available to the user.

SUMMARY

The illustrative embodiments provide a method, system, and computer program product. An embodiment includes a method that analyzes, using a processor and a memory, a portion of a software product to determine a first language used in the portion and a subject-matter domain of the portion. The embodiment extracts using the processor and the memory, a string from the portion, wherein the string has been translated into the first language of the string from an original string in an original language, the original string existing in a version of the software product in the original language. The embodiment selects a corpus, wherein the corpus comprises a set of stored strings, each stored string in the set being in the first language, and wherein a subset of the set of stored strings is selected from a content that is related to the subject-matter domain of the software product. The embodiment selects, responsive to the string matching a stored string in the corpus, the string into a shortlist. The embodiment excludes, from the shortlist a second string extracted from the portion, the second string failing to match any stored string in the corpus. The embodiment outputs the shortlist, the outputting causing a review of an accuracy of a machine translation process to be performed.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
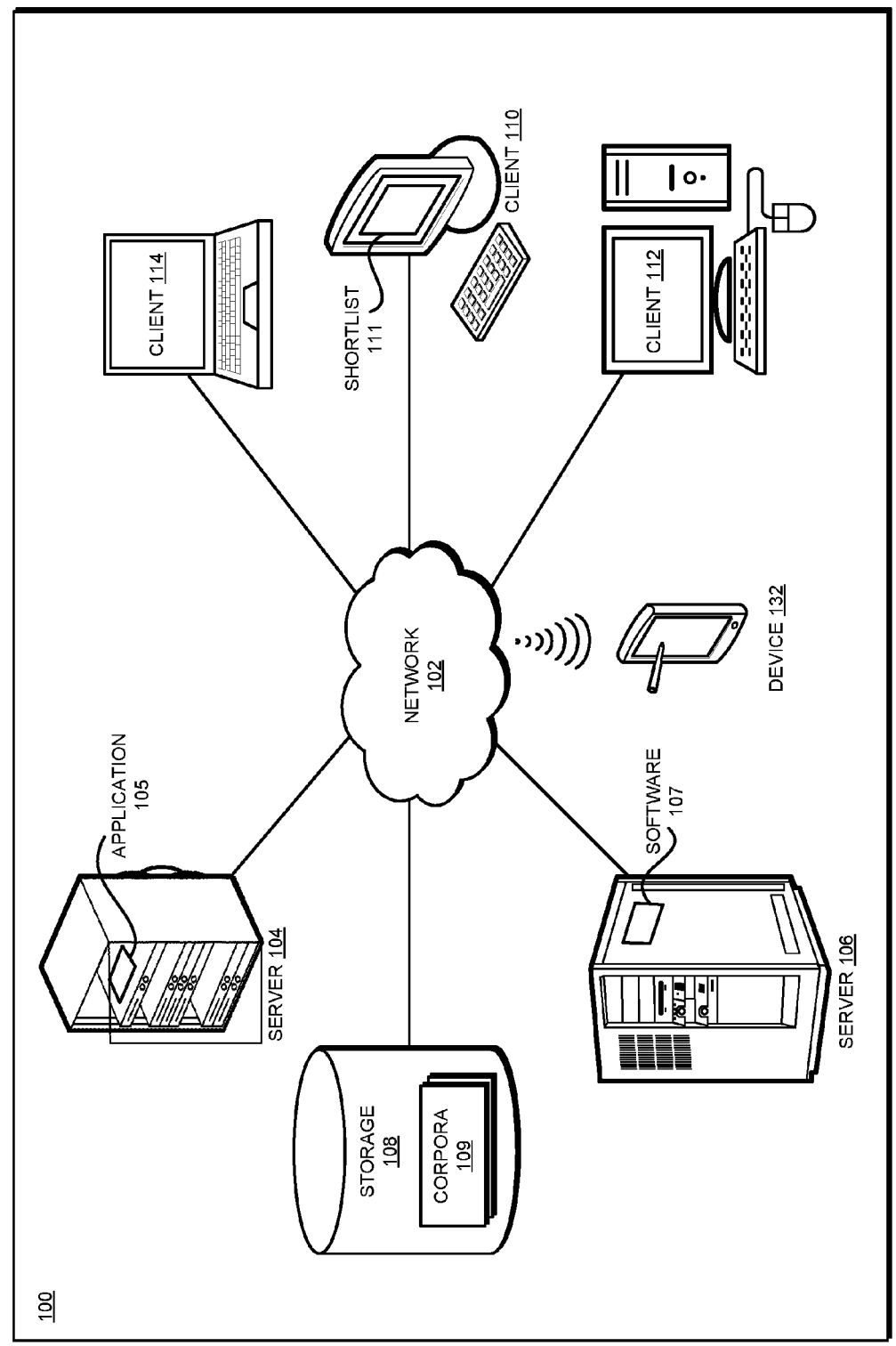
FIG. 1 depicts a block diagram of a network of data processing systems in which illustrative embodiments may be implemented.

Within the scope of the illustrative embodiments, a string is a text fragment from any translatable content of any element of a software product. At least in some embodiments, the translated languages described herein are natural human languages rather than computer programming languages.

The illustrative embodiments recognize that as more software development teams use machine translation engines to translate the elements of their software products, there is an emerging need to rapidly identify the machine translated content that should be reviewed and/or edited by professional human translators. The illustrative embodiments recognize that one of the significant challenges with using machine translation, rather than using professional translation, is the quality of the machine translated results. In some cases, an important string that is crucial to understanding how a product works, or to using the product, may be incorrectly machine translated or translated awkwardly in such way that the resulting translation is unintelligible or at least undesirable in some respects.

Presently, a development team has to have all machine translated content reviewed by a professional translator even though there may only be a small amount of content that actually should be reviewed by a professional translator. Having to review all the machine translated content undesirably adds time, resources, and other costs to a product development schedule.

The illustrative embodiments recognize that a method to rapidly and automatically identify machine translated strings that should be reviewed by a professional translator would be useful in reducing the time and cost in software product development.

The illustrative embodiments further recognize that preferably, not all but only those strings that are important to the usage of a software product should be reviewed by a professional translator. The illustrative embodiments recognize that a problem with reviewing only the important strings is that each software developer has to spend time and effort in identifying what the developer regards as important strings in the portion of a product for which the developer is responsible.

The illustrative embodiments recognize that additional problems are associated with having the developers identify the strings whose machine translations should be reviewed. This approach not only costs the developer time and effort, but different developers may also differ in their selections of strings. A string that one developer regards as important in one portion of the product may not be identified as important by another developer in another portion of the product. The developer-selected selection of important strings might still leave the machine translations of some important strings without review.

The illustrative embodiments used to describe the invention generally address and solve the above-described problems and other problems related to identifying, in a software product, machine translated strings that should be regarded as important and should be selected for review by a human reviewer.

An embodiment can be implemented as a software application. The application implementing an embodiment can be configured as a modification of an existing machine translation system, as a separate application that operates in conjunction with an existing machine translation system, a standalone application, or some combination thereof.

A software product pertains to a subject-matter domain. For example, one product may be directed to the subject-matter domain of banking and finance, whereas another product might be directed to the subject-matter domain of healthcare, and yet another product might be directed to the subject-matter domain of music and entertainment. A product can be directed to one or more subject-matter domains. Any number of products can be directed to any number of subject-matter domains in a similar manner.

An embodiment constructs a corpus of strings that are regarded as important in a subject-matter domain. For example, a user, including but not necessarily a developer of a software product, e.g., a subject-matter expert with or without the knowledge of the software product, contributes a set of strings formed in a language and pertaining to the subject-matter domain. As an example, one or more strings in the corpus may be selected from a document or other content that is related to the subject-matter domain but not sourced from the software product, not a part of the software product, or unrelated to the software product.

Thus, a corpus according to the illustrative embodiments is specific to a subject-matter domain and a language. A corpora according to the illustrative embodiments can therefore include a different corpus for the same subject-matter domain in a different language, a different corpus for different subject-matter domain in the same language, and other combinations thereof. The contributors to a corpus can be anyone who can be regarded as knowledgeable in a subject-matter in a given language, regardless of their knowledge of or familiarity with a software product.

An embodiment allows a corpus to grow and/or change over time. For example, new or different subject-matter experts may add new strings or change an existing string in a corpus. Similarly, as new terminology develops—e.g., through the introduction of new software products, evolution of a language, evolution of a subject-matter domain, and the like—a corpus can change or expand with such developments.

An embodiment receives a machine translated software product, e.g., by receiving the code of the product, documentation of the product, and generally any combination of elements of a product where a machine string can be found. The embodiment analyzes the product to identify a language of the product. The embodiment analyzes the product, e.g., the code of the product, to determine a subject-matter domain of the product.

The embodiment selects a corpus that is related to the subject-matter domain and language of the received product. The embodiment extracts a string from the received product. The embodiment performs a semantic match between the string found in the received product and the strings stored in a corpus.

For the semantic match, the embodiment may use any one or more of the existing sematic matching algorithms. Furthermore, the semantic match between a string in the product and a string in the corpus can be, but need not be, an exact match. For example, the embodiment can specify, or the semantic matching algorithm can be configured with, a tolerance threshold, where if the string from the product matches a string from the corpus within the tolerance threshold, the strings are regarded as matching. Although a tolerance threshold can be generally specified to be applicable to a product, it is contemplated within the scope of the illustrative embodiments, that different tolerance thresholds can be specified for different subject-matter domains, different tolerance thresholds can be specified for different languages, different tolerance thresholds can even be specified for different strings or sets of strings, or some combination thereof, as may be suitable for a given product.

When the embodiment finds a string from the product that matches a string in the corpus within a tolerance threshold, the embodiment selects the string—which is a machine translated string—into a shortlist. The embodiment analyzes the product, identifies a set of machine translated strings therein, and selects a subset of the set of machine translated strings into the shortlist. The embodiment outputs the shortlist for a human reviewer to review. At least in some embodiments, the strings are selected (or not selected) for human review of their translations based on determinations made in the original language (e.g., using a corpus that is in the original language) rather than in the second translated language.

A method of an embodiment described herein, when implemented to execute on a device or data processing system, comprises substantial advancement of the functionality of that device or data processing system in selectively reviewing machine translations in software products. For example, presently available methods for reviewing machine translated text relies on subjecting the entire machine translated text to review by a human expert. An embodiment allows subject-matter experts to contribute to an independently evolving corpus a set of strings that the experts regard as important in the subject-matter domain in a given language. The embodiment uses the corpus to selectively identify only some strings from a given software product and presents the shortlist of selected strings for human review. This manner of automatic identification of machine translation review candidates is unavailable in the presently available methods. Thus, a substantial advancement of such devices or data processing systems by executing a method of an embodiment is in efficient, automatic, selective, and evolving review of machine translations in software products.

The illustrative embodiments are described with respect to certain types of software products, contents, elements, strings, languages, subject-matter domains, experts, corpora, sematic matching algorithms, tolerances, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
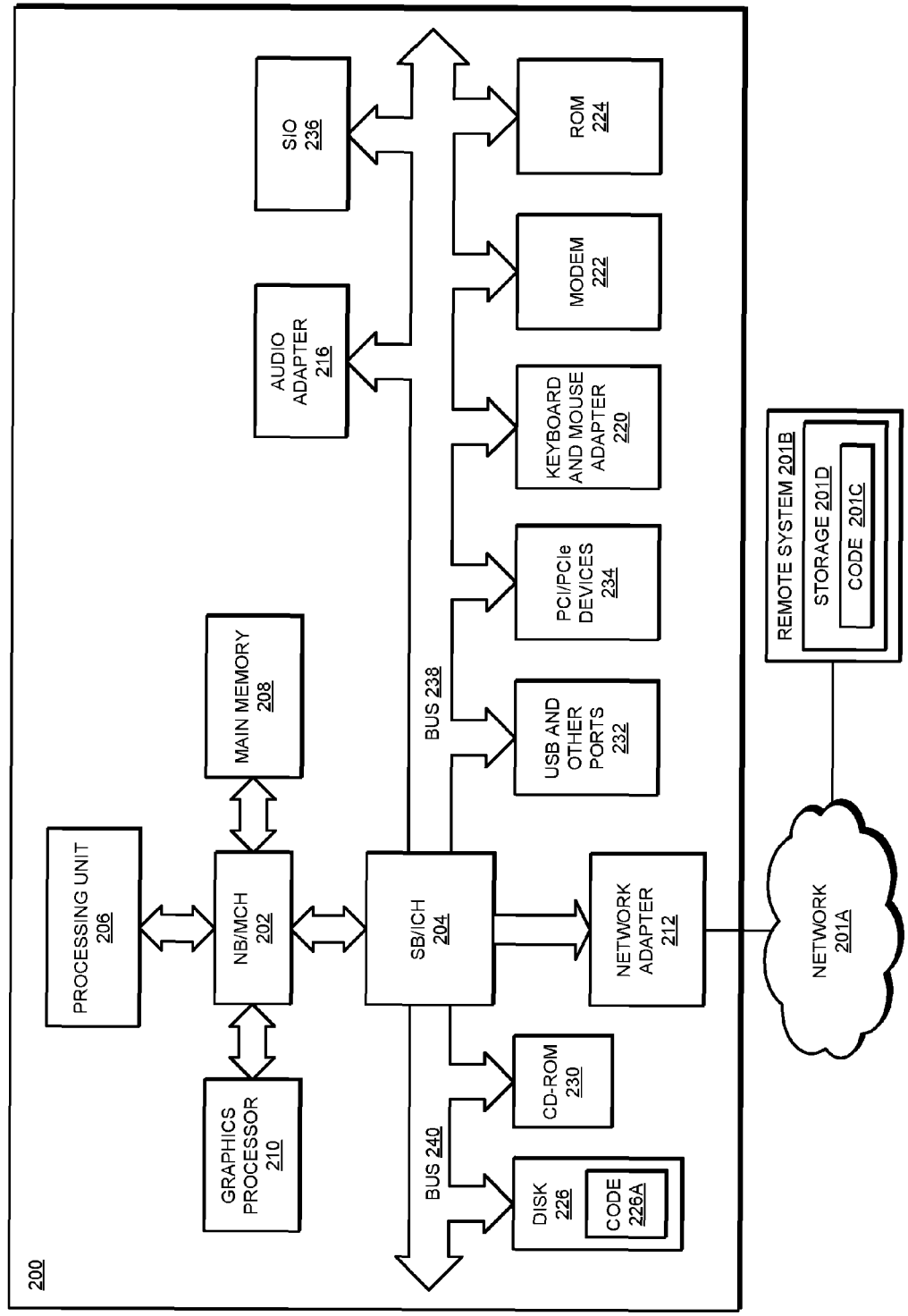
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Software 107 is a software product that includes machine translated content in one or more elements, including but not limited to the code of the product. Application 105 analyzes software 107 using one or more corpus from corpora 109, and produces shortlist 111. Shortlist 111 includes a subset of a set of machine translated strings found in software 107, and the subset is selected and presented for review by a human translator.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
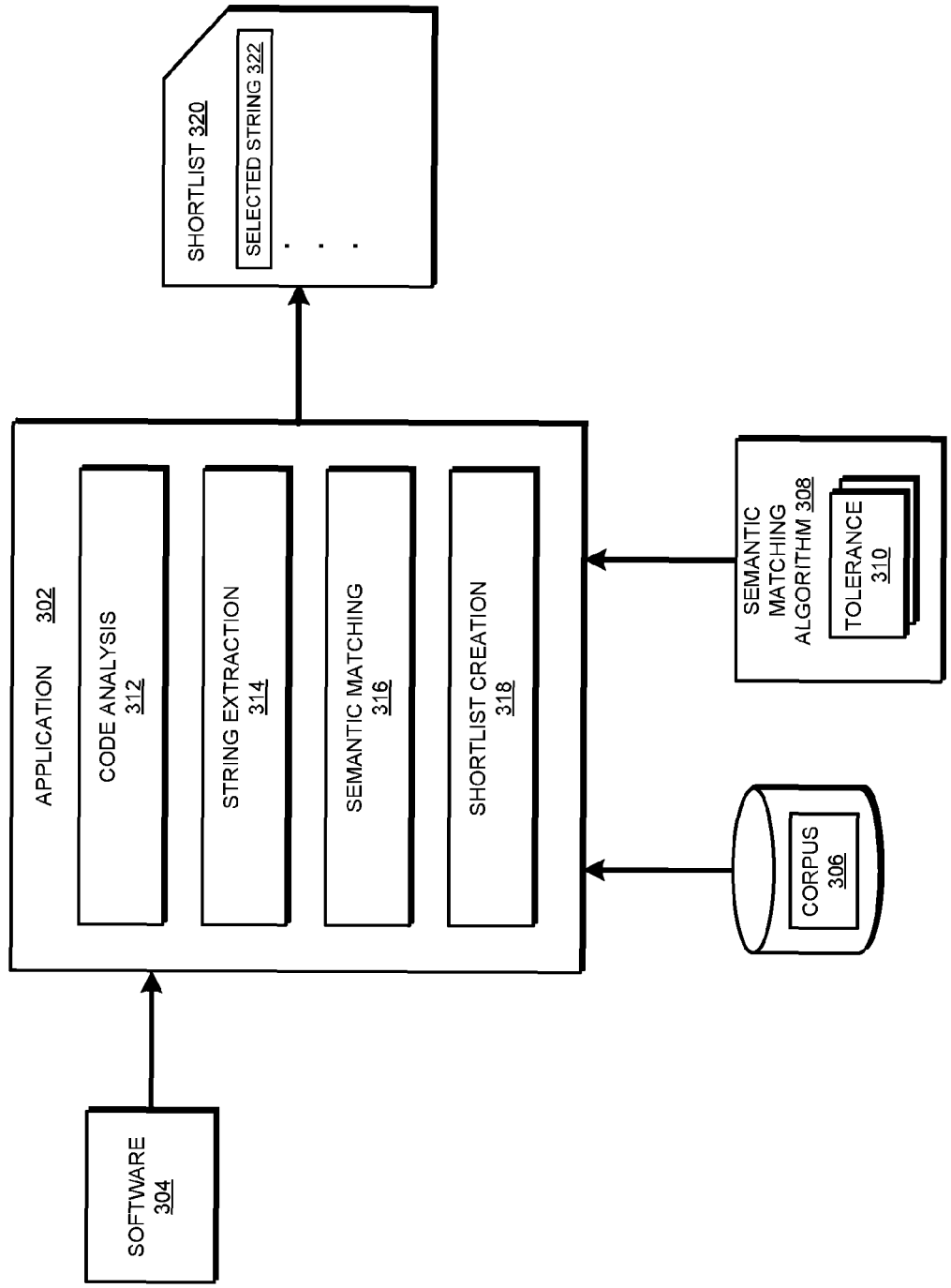
FIG. 3 depicts a block diagram of an example configuration for automatic identification of machine translation review candidates in accordance with an illustrative embodiment.

With reference to FIG. 3, this figure depicts a block diagram of an example configuration for automatic identification of machine translation review candidates in accordance with an illustrative embodiment. Application 302 is an example of application 105 in FIG. 1. Software 304 is a software product with machine translated elements, and is an example of software 107 in FIG. 1.

Corpus 306 is a corpus from corpora 109 in FIG. 1. Semantic matching algorithm 308 is one or more algorithms selected to perform semantic matching of strings of a language, as described herein. One or more tolerance thresholds 310 can be specified for one or more algorithms 308 to use in the semantic matching exercise.

Generally, the code of software 304 implements a variety of elements, such as UI components and static content used in the UI and elsewhere in software 304. The code is used only as a non-limiting example element of software 304 to describe certain operations of the various embodiments. An embodiment can be adapted for use with other elements, such as the documentation of software 304, and such adaptations are contemplated within the scope of the illustrative embodiments.

Component 312 analyzes the code of software 304 to identify a language of the machine translation used in software 304, and a subject-matter domain of software 304. For example, component 312 parses the code using Natural Language Processing (NLP) for the language and subject-matter domain determinations.

Component 314 extracts a set of machine translated strings from the code. Component 316 uses algorithm 308 and tolerance 310 to match an extracted string with a string in corpus 306. If a match within tolerance 310 is found between the extracted string and a string in corpus 306, component 318 selects the extracted string in shortlist 320. For example, the matching extracted string forms selected string 322 in shortlist 320.

Figure 4:
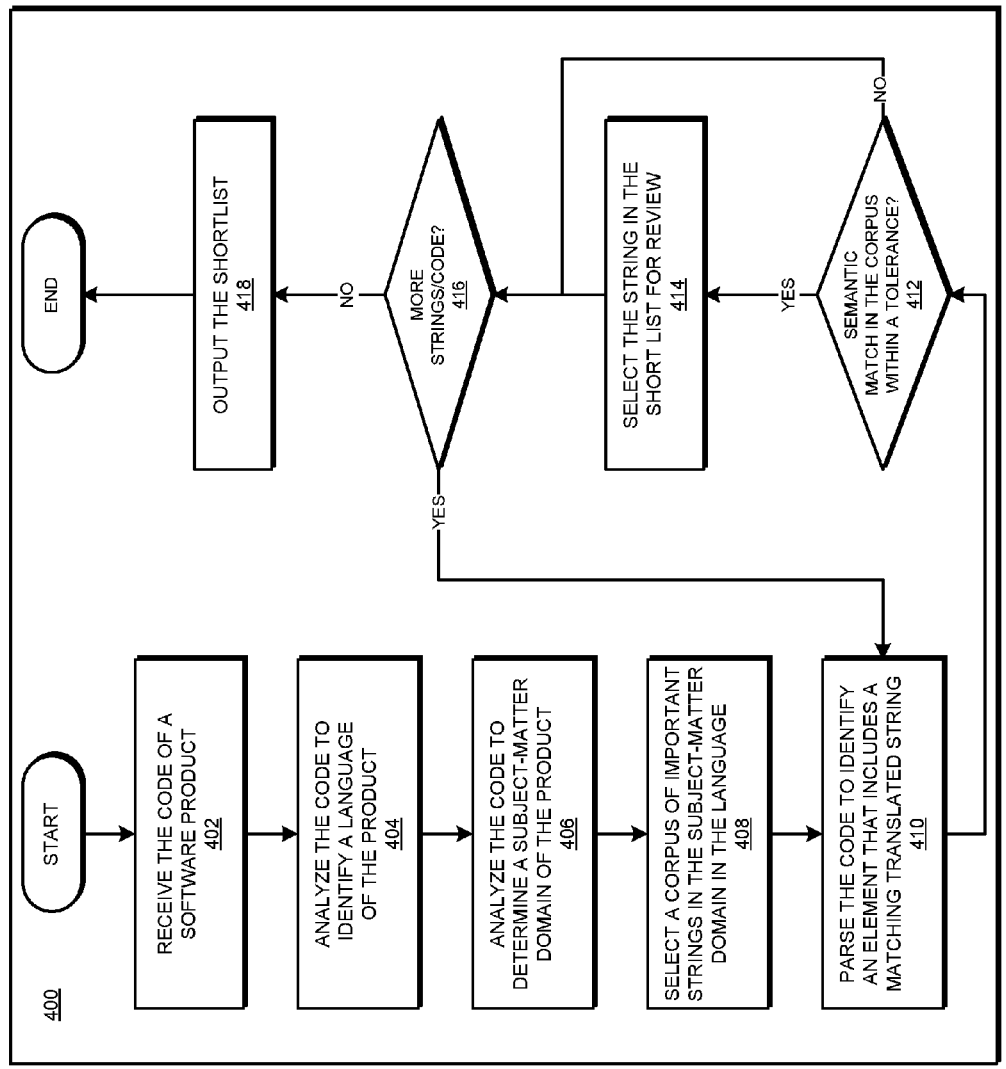
FIG. 4 depicts a flowchart of an example process for automatic identification of machine translation review candidates in accordance with an illustrative embodiment.

With reference to FIG. 4, this figure depicts a flowchart of an example process for automatic identification of machine translation review candidates in accordance with an illustrative embodiment. Process 400 can be implemented in application 302 in FIG. 3.

The application receives a software product, or a portion thereof—such as the code of the product—which includes machine translated content (block 402). Again, the code is used only as a non-limiting example to describe the operations of an embodiment, and the operation can be performed on other portions of a software product, such as the documentation, which may also include machine translated content. For example, assume that process 400 is being applied in an example use-case to a translation of a Japanese software product into English.

The application analyzes the portion, e.g., the code, of the product to determine a language of the machine translated content in the portion (block 404). In the example use-case, the language would be English as machine translated from Japanese. The application analyzes the portion, e.g., the code, to determine a subject-matter domain of the product (block 406). For example, in the example use-case, suppose that the Japanese software is a financial software product. Therefore, the subject-matter domain of the product is 'financial'. The application selects a corpus of important strings, where the corpus is configured for use with the identified subject-matter domain in the identified language (block 408). In the example use-case, the corpus may include a knowledge base of financial information, manners of presenting financial information, terminology used in the financial industry, and the like.

The application parses the portion, e.g., the code, to identify an element that includes a machine translated string (block 410). For example, in the example use-case, the machine translated string may be "sum", which has dual meaning in financial domain—a total, or an amount. The application determines whether the string matches a string in the corpus within a tolerance threshold (block 412). If the string matches a string in the corpus within the tolerance threshold ("Yes" path of block 412), the application selects the string in the shortlist for human review (block 414). In the example use-case, the string "sum" may be selected for human review to ensure that the string is used in the correct meaning, given its dual meanings in English. The application then determines whether more strings can be extracted and compared with the corpus in a similar manner (block 416). If the string does not match any string in the corpus within the tolerance threshold ("No" path of block 412), the application proceeds to make the determination of block 416.

If more strings can be extracted and compared with the corpus in a similar manner ("Yes" path of block 416), the application returns to block 410 to select another string. If no more strings can be extracted and compared with the corpus in a similar manner ("No" path of block 416), the application outputs the shortlist (block 418). The application ends process 400 thereafter.

Thus, a computer implemented method, system or apparatus, and computer program product are provided in the illustrative embodiments for automatic identification of machine translation review candidates and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
analyzing, using a processor and a memory, a portion of a software product to determine a first language used in the portion and a subject-matter domain of the portion;
extracting using the processor and the memory, a string from the portion, wherein the string has been translated into the first language of the string from an original string in an original language, the original string existing in a version of the software product in the original language;
selecting a corpus, wherein the corpus comprises a set of stored strings, each stored string in the set being in the first language, and wherein a subset of the set of stored strings is selected from a content that is related to the subject-matter domain of the software product;
selecting, responsive to the string matching a stored string in the corpus, the string into a shortlist;
excluding, from the shortlist a second string extracted from the portion, the second string failing to match any stored string in the corpus; and
outputting the shortlist, the outputting causing a review of an accuracy of a machine translation process to be performed.

2. The method of claim 1, wherein the content is not a part of the software product.

3. The method of claim 1, wherein the content is unrelated to the software product.

4. The method of claim 1, wherein the string comprises a text portion in the first language, the string resulting from the machine translation of the portion from the original language to the first language.

5. The method of claim 1, wherein the portion comprises a user interface implementation in the software product, and wherein the user interface implementation comprises the string.

6. The method of claim 5, wherein the string is a part of static content in the user interface implementation.

7. The method of claim 1, further comprising:
selecting, as the portion of the software product, code of the software product, wherein the code includes the string.

8. The method of claim 1, further comprising:
constructing the corpus, wherein the constructing causes a new stored string to be added to the corpus, the new stored string not being present in the software product.

9. The method of claim 1, further comprising:
updating the corpus, wherein the updating causes an existing stored string to be modified in the corpus, the existing stored string being present in the software product.

10. The method of claim 1, wherein, upon the outputting of the shortlist, the selection of the string into the shortlist and the exclusion of the second string from the shortlist cause the review of the accuracy of the machine translation process to be performed on the string and not on the second string.

11. A computer usable program product comprising one or more computer-readable storage devices, and program instructions stored on at least one of the one or more storage devices, the stored program instructions comprising:
program instructions to analyze, using a processor and a memory, a portion of a software product to determine a first language used in the portion and a subject-matter domain of the portion;
program instructions to extract using the processor and the memory, a string from the portion, wherein the string has been translated into the first language of the string from an original string in an original language, the original string existing in a version of the software product in the original language;
program instructions to select a corpus, wherein the corpus comprises a set of stored strings, each stored string in the set being in the first language, and wherein a subset of the set of stored strings is selected from a content that is related to the subject-matter domain of the software product;
program instructions to select, responsive to the string matching a stored string in the corpus, the string into a shortlist;
program instructions to exclude, from the shortlist a second string extracted from the portion, the second string failing to match any stored string in the corpus; and
program instructions to output the shortlist, the outputting causing a review of an accuracy of a machine translation process to be performed.

12. The computer usable program product of claim 11, wherein the content is not a part of the software product.

13. The computer usable program product of claim 11, wherein the content is unrelated to the software product.

14. The computer usable program product of claim 11, wherein the string comprises a text portion in the first language, the string resulting from the machine translation of the portion from the original language to the first language.

15. The computer usable program product of claim 11, wherein the portion comprises a user interface implementation in the software product, and wherein the user interface implementation comprises the string.

16. The computer usable program product of claim 15, wherein the string is a part of static content in the user interface implementation.

17. The computer usable program product of claim 11, further comprising:
program instructions to select, as the portion of the software product, code of the software product, wherein the code includes the string.

18. The computer usable program product of claim 15, wherein the computer usable code is stored in a computer readable storage device in a data processing system, and wherein the computer usable code is transferred over a network from a remote data processing system.

19. The computer usable program product of claim 15, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze, using a processor and a memory, a portion of a software product to determine a first language used in the portion and a subject-matter domain of the portion;

program instructions to extract using the processor and the memory, a string from the portion, wherein the string has been translated into the first language of the string from an original string in an original language, the original string existing in a version of the software product in the original language;

program instructions to select a corpus, wherein the corpus comprises a set of stored strings, each stored string in the set being in the first language, and wherein a subset of the set of stored strings is selected from a content that is related to the subject-matter domain of the software product;

program instructions to select, responsive to the string matching a stored string in the corpus, the string into a shortlist;

program instructions to exclude, from the shortlist a second string extracted from the portion, the second string failing to match any stored string in the corpus; and program instructions to output the shortlist, the outputting causing a review of an accuracy of a machine translation process to be performed.

\* \* \* \* \*